(12) United States Patent
Hindman

(10) Patent No.: US 7,104,052 B1
(45) Date of Patent: Sep. 12, 2006

(54) HYDRAULIC CYLINDER WITH INTEGRATED ACCUMULATOR

(75) Inventor: Jahmy Jomont Hindman, Durango, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/080,008

(22) Filed: Mar. 15, 2005

(51) Int. Cl.
*F15B 1/00* (2006.01)

(52) U.S. Cl. .......................... 60/413; 60/415
(58) Field of Classification Search ................. 60/413, 60/415; 92/85 B, 134
See application file for complete search history.

(56) References Cited

U.S. PATENT DOCUMENTS

| 2,163,982 | A | * | 6/1939 | Mereier ....................... 92/132 |
| 2,193,736 | A | * | 3/1940 | Onions ......................... 92/134 |
| 2,679,827 | A | * | 6/1954 | Perdue ......................... 92/134 |
| 3,677,142 | A | | 7/1972 | Roth |
| 3,869,861 | A | | 3/1975 | Case et al. |
| 5,034,184 | A | * | 7/1991 | Stevens et al. ............. 376/231 |
| 7,047,734 | B1 | * | 5/2006 | Tosen et al. .................. 60/413 |

FOREIGN PATENT DOCUMENTS

| GB | 1 227 353 A | 4/1971 |
| GB | 2 097 860 A | 11/1982 |
| JP | 2002372008 A | 12/2002 |

OTHER PUBLICATIONS

Communication from European Patent Office, May 11, 2006, 6 pages.

* cited by examiner

*Primary Examiner*—Thomas E. Lazo

(57) ABSTRACT

A hydraulic cylinder assembly includes a hydraulic cylinder and an integral concentric accumulator. The hydraulic cylinder has a first piston surface for extending the cylinder, a second piston surface for retracting the cylinder and a third piston surface in dedicated communication with the accumulator.

11 Claims, 4 Drawing Sheets

HYDRAULIC CYLINDER WITH INTEGRATED ACCUMULATOR

FIELD OF THE INVENTION

The invention relates to hydraulic cylinders and, more particularly, relates to hydraulic cylinders with integrated accumulators. Such hydraulic cylinders are normally used in off-road work vehicles, i.e., construction equipment.

BACKGROUND OF THE INVENTION

Conventional hydraulic cylinders in hydraulic circuits utilizing hydraulic accumulators come under the following two general categories: (1) stand alone hydraulic cylinders using remote accumulators and (2) hydraulic cylinder assemblies formed by integrating hydraulic cylinders with the accumulators. Addressed herein are hydraulic cylinder assemblies.

SUMMARY OF THE INVENTION

Conventional hydraulic cylinders falling under category (1) are separated from the remote accumulators by hydraulic equipment having a resistance to the flow of hydraulic energy. Thus, in such systems, the net amount of energy delivered to the conventional hydraulic cylinder is reduced as the hydraulic fluid flows through intervening hydraulic equipment such as hydraulic lines, spool valves, etc. Further, any spatial considerations are amplified as each intervening piece of hydraulic equipment, including the accumulator tends to awkwardly consume space. For these and other reasons, such systems suffer from the standpoint of energy and spatial efficiency.

Conventional hydraulic cylinders falling under category (2) tend to be bulky and awkward. The hydraulic lines and valve(s) necessitated in arrangements for hydraulic cylinders under category (1) are often eliminated but the accumulator is usually bulky and awkwardly placed. The awkwardness of such an arrangement tends to limit its usefulness, particularly on off road vehicles requiring optimal ranges of motion and having limited space available.

Described herein is a hydraulic cylinder assembly where the accumulator at least partially surrounds the outer cylindrical wall of the hydraulic cylinder. The particular accumulator described is concentric with the outer wall of the hydraulic cylinder. Thus, it follows that the outer diameter of the accumulator decreases as the length of cylinder wall covered increases. Such an arrangement tends to minimize bulkiness and awkwardness of the hydraulic cylinder assembly as what remains is a hydraulic cylinder with a slightly larger diameter.

The accumulator described herein includes a piston that tends to slow down as it reaches the end of travel during an extension of the hydraulic cylinder. This feature is a cushioning effect that minimizes the risk of shock loading from the accumulator piston suddenly slamming into an accumulator wall at the end of travel and results from progressive blockage, by the accumulator piston, of flow from the accumulator to the cylinder.

BRIEF DESCRIPTION OF THE DRAWINGS

The invention will be described in detail, with references to the following figures, wherein.

DESCRIPTION OF THE ILLUSTRATED EMBODIMENT

Figure 1:
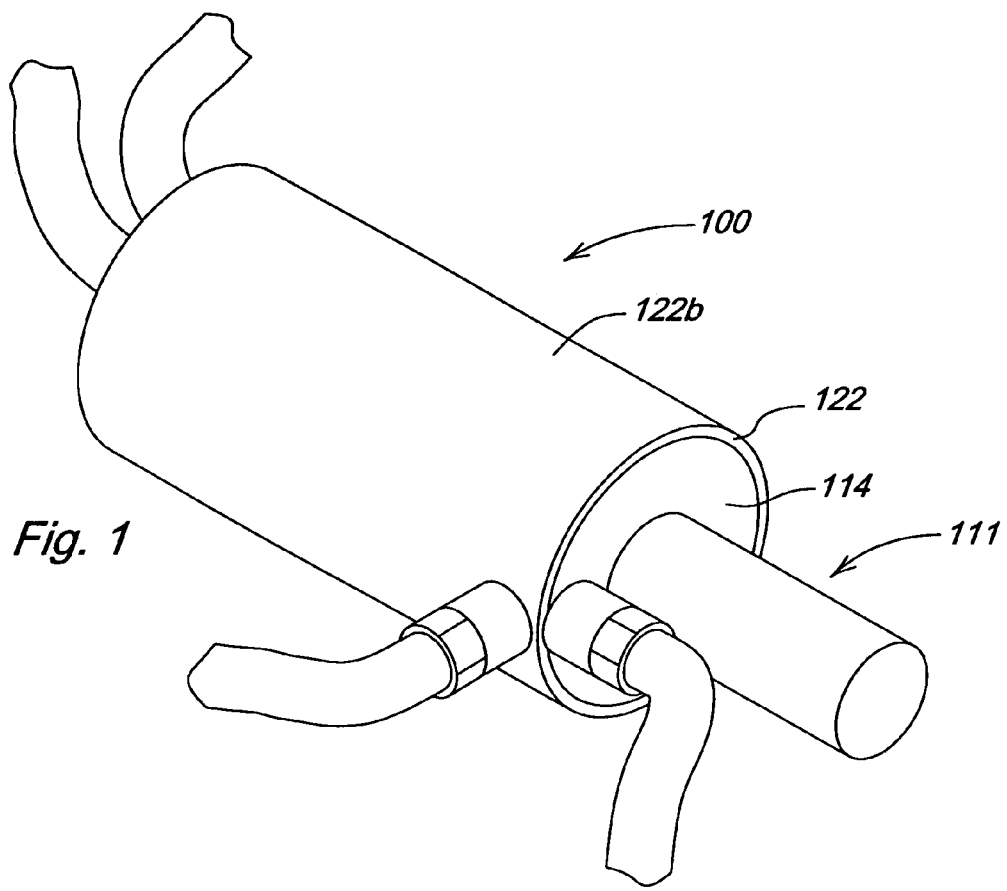
FIG. 1 is an oblique frontal view of an exemplary embodiment of the hydraulic cylinder assembly of the invention with exemplary hosing.
Figure 2:
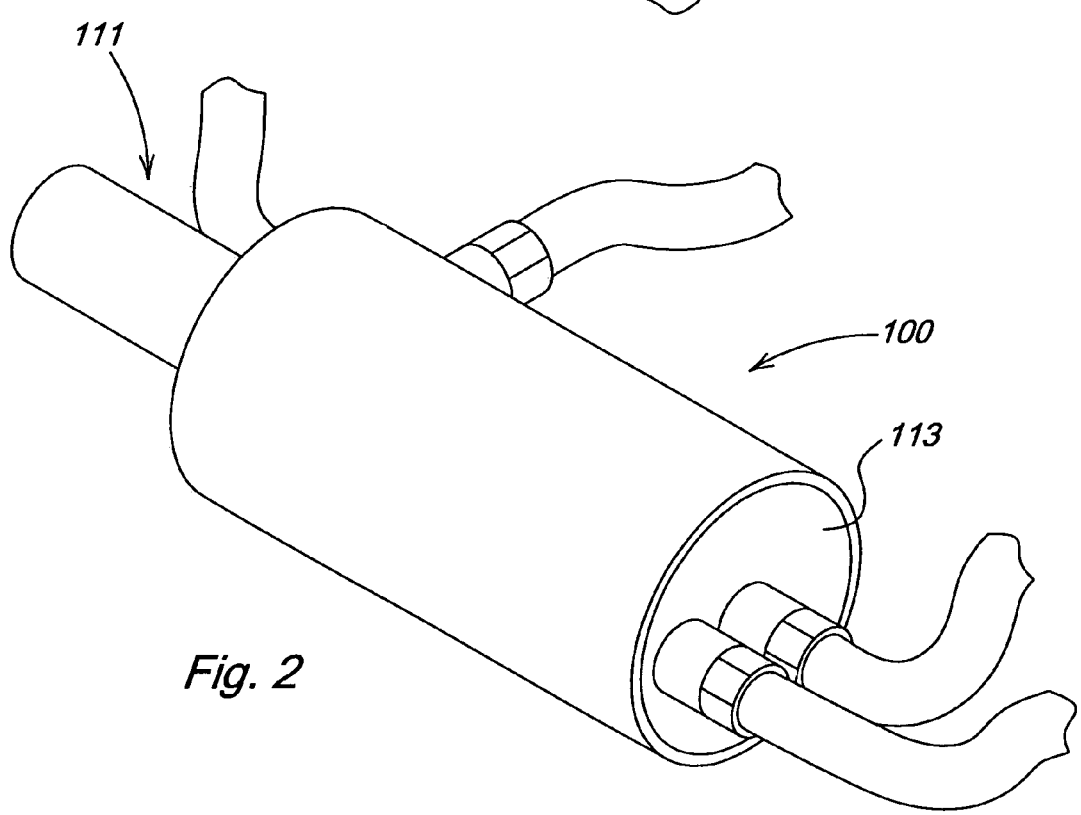
FIG. 2 is an oblique rear view of the exemplary embodiment illustrated in FIG. 1.
Figure 3:
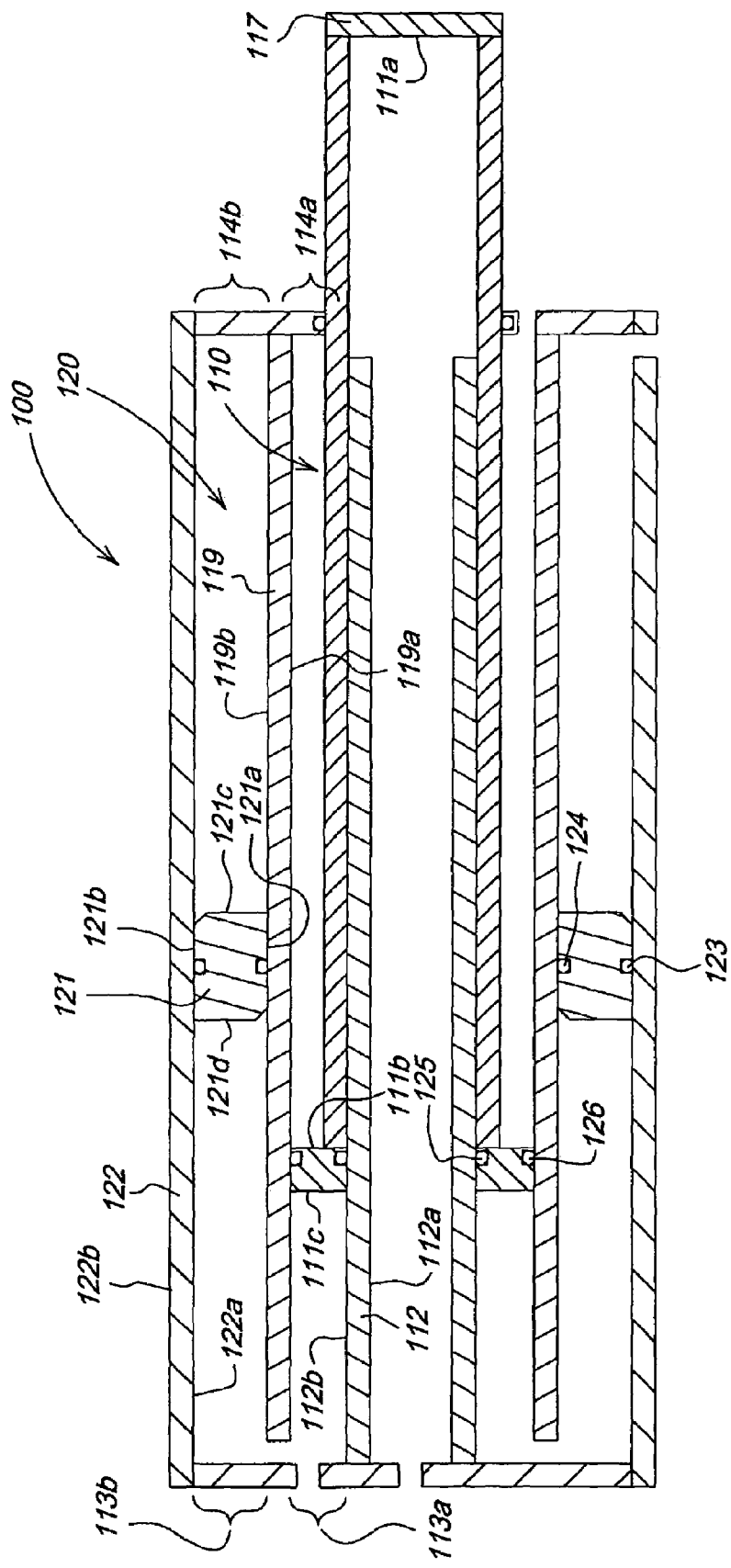
FIG. 3 is a sectional schematic of the hydraulic cylinder assembly illustrated in FIGS. 1 and 2 with the exemplary hosing removed.
Figure 4:
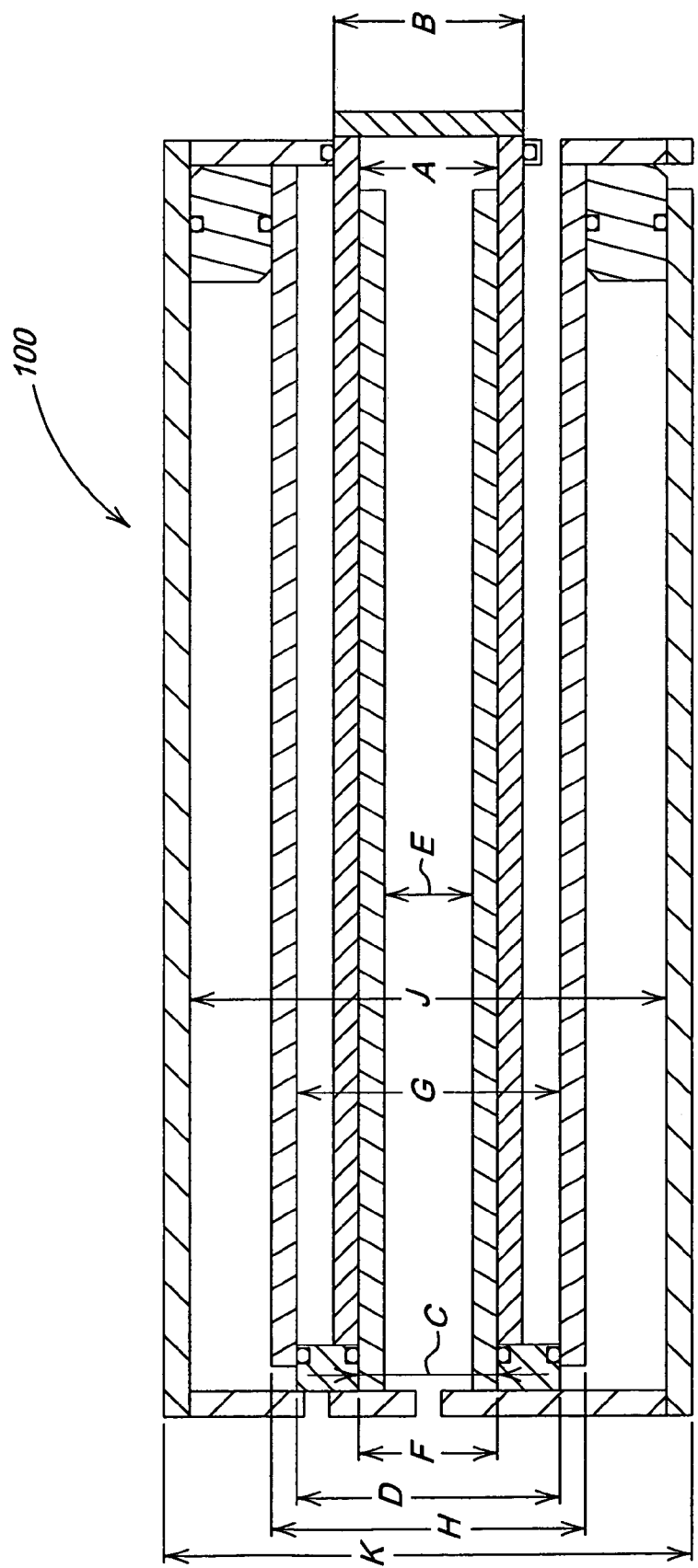
FIG. 4 is another sectional schematic of the hydraulic cylinder assembly illustrated in FIGS. 1 and 2 with the exemplary hosing removed and fully retracted.
Figure 5:
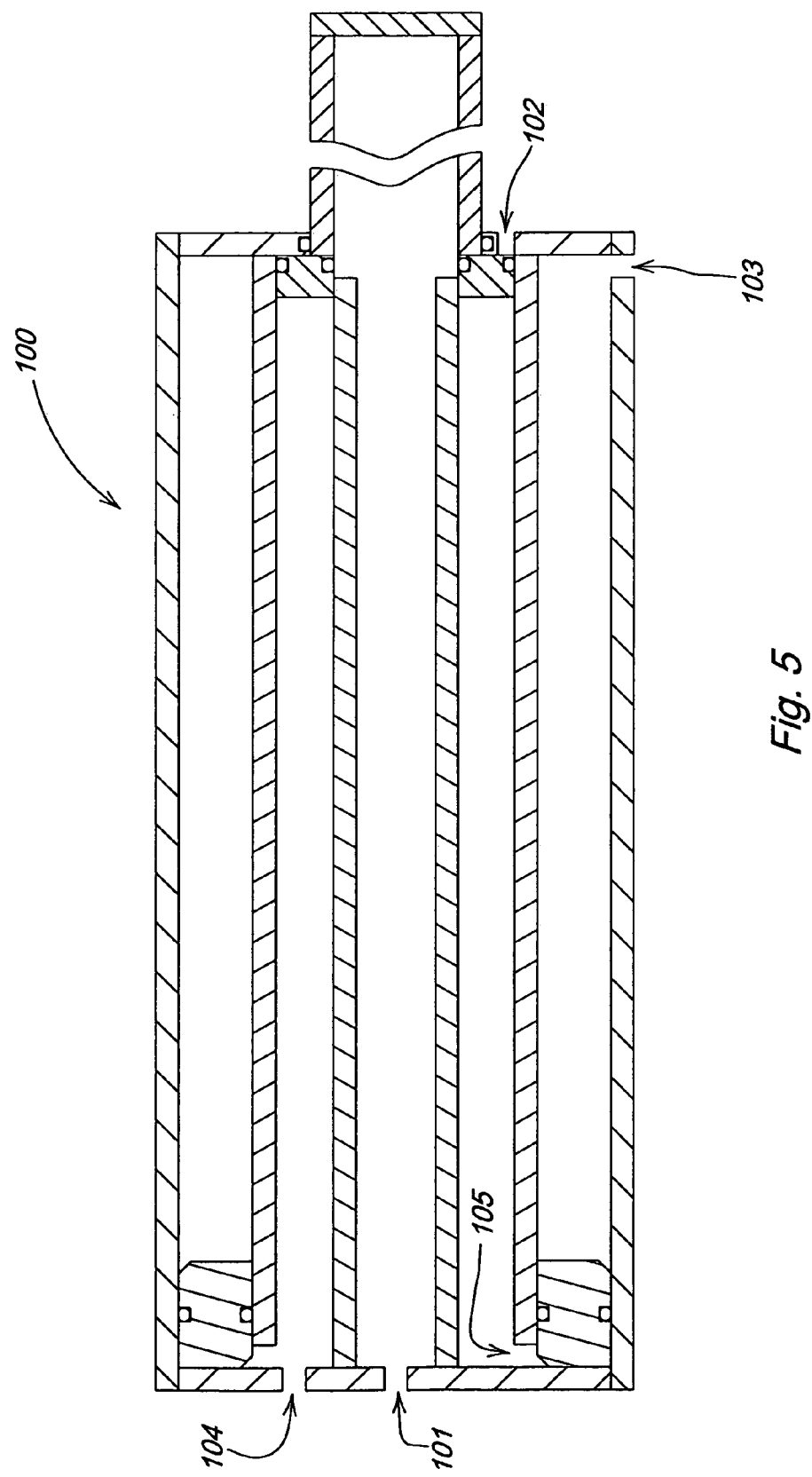
FIG. 5 is another sectional schematic of the hydraulic cylinder assembly illustrated in FIGS. 1 and 2 with the exemplary hosing removed and fully extended.

FIGS. 1 and 2 are oblique views of an exemplary embodiment of the invention. FIGS. 3, 4 and 5 are schematics of the exemplary embodiment illustrated in FIGS. 1 and 2. The embodiment illustrated is a hydraulic cylinder assembly 100 which includes: a hydraulic cylinder 110 having first, second and third cylinder ports 101, 102 and 104; and a hydraulic accumulator 120 that is concentric with and integral to the hydraulic cylinder 110 having first and second accumulator ports 103 and 105.

The hydraulic cylinder 110 includes: a piston rod 111; a first longitudinal cylinder wall 112; a second longitudinal cylinder wall 119; a first cylinder end wall portion 113a; a second cylinder end wall portion 114a; a first cylinder port 101; and a second cylinder port 102. The piston rod 111 includes: a cylindrical rod portion 116 having an inner rod diameter A and an outer rod diameter B; a rod end wall 117 enclosing a first end of the cylindrical rod portion 116; and a piston ring disk 118 having a first ring surface 118a with an inner piston ring disk diameter C approximately equal to the inner rod diameter A and a second ring surface 118b with an outer piston ring disk diameter D. The piston rod 111 also includes first, second and third piston rod surfaces 111a, 111b and 111c in communication with the first cylinder port 101, the second cylinder port 102 and the third cylinder port 104, respectively. The piston rod surface 111c is also in communication with the second accumulator port 105. The effective area of the first piston rod surface 111a is approximately equal to the effective area of the second piston rod surface 111b. The effective area is defined as the component of a surface area that is orthogonal to a direction of movement for the part associated with the surface area.

As illustrated in FIGS. 3, 4 and 5, the piston ring disk 118 is outfitted with a first o-ring 125 and a second o-ring 126 on its first and second ring surfaces 118a, 118b. These o-rings 125, 126 slidably seal the interfaces between the second cylinder inner surface 119a and the second ring surface 118b and between the first cylinder outer surface 112b and the first ring surface 118a.

The first longitudinal cylinder wall 112 includes a first cylinder inner surface 112a with a first cylinder inner surface diameter E and a first cylinder outer surface 112b with a first cylinder surface outer diameter F. The second longitudinal cylinder wall 119 includes a second cylinder inner surface 119a with a second cylinder inner surface diameter G and a second cylinder outer surface 119b with a second cylinder outer surface diameter H. An end wall o-ring 115 along an end wall inner diameter L of the second cylinder end wall 114 slidably seals an interface between the second cylinder end wall 114 and the piston rod 111.

The accumulator 120 includes: a piston 121 with a first accumulator piston surface 121a, a second accumulator piston surface 121b, a third accumulator piston wall surface 121c and a fourth accumulator piston wall surface 121d; a first longitudinal accumulator wall 122; a first accumulator end wall portion 113b; a second accumulator end wall portion 114b; and a second longitudinal accumulator wall which is, in this particular embodiment, the second longitudinal cylinder wall 119. The first longitudinal accumulator wall 122 includes a first accumulator wall surface 122a with a first accumulator wall diameter J and a second accumulator wall surface 122b with a second accumulator wall diameter K. An inner accumulator o-ring 123 and an outer accumulator o-ring 124 slidably seal the interfaces between the first accumulator wall surface 122a and the first accumulator piston surface 121a and between the second cylinder outer surface 119b and the second accumulator piston surface 121b. The third accumulator piston wall surface 121c is in communication with the first accumulator port 103 and the fourth accumulator piston wall surface 121d is in communication with the second accumulator port 105.

In operation, the accumulator 120 is charged with an inert gas at the first accumulator port 103 and the hydraulic cylinder 110 and the accumulator 120 are pre-filled with hydraulic fluid at the third cylinder port 104 and the second accumulator port 105, respectively. The hydraulic cylinder assembly 100 is then extended as hydraulic fluid enters the first cylinder port 101 under sufficient pressure. As the hydraulic cylinder assembly 100 extends, the accumulator piston moves toward the first accumulator end wall 113b and the pressure between the third accumulator piston wall 121c and the second accumulator end wall 114b decreases as stored energy is released.

The hydraulic cylinder assembly 100 is retracted as hydraulic fluid enters the second cylinder port 102 under sufficient pressure. The hydraulic cylinder assembly 100 is retracted as hydraulic fluid enters the second cylinder port 102 under sufficient pressure and hydraulic fluid is allowed to drain from the first cylinder port 101. As the hydraulic cylinder assembly 100 retracts, the third piston rod cylinder wall 111c moves toward the first hydraulic cylinder end wall 113a. This causes hydraulic fluid to flow into the second accumulator port 105, increasing the pressure against the fourth accumulator piston wall 121d and causing the accumulator piston 121 to increase gas pressure against the third accumulator piston wall 121c by moving the accumulator piston 121 toward the second accumulator end wall 114b. Hydraulic energy is stored in the accumulator as the accumulator piston 121 moves toward the second accumulator wall. Stored hydraulic energy is released from the accumulator 120 when the hydraulic cylinder assembly 100 is, once again, extended and the accumulator piston 121 moves toward the first accumulator end wall 113b, causing hydraulic fluid to flow across the second accumulator port 105 with pressure sufficient to act on the third piston rod surface 111c and aid in the extension.

As illustrated in FIGS. 3, 4 and 5, the accumulator piston 121 progressively blocks the second accumulator port 105 as the accumulator piston 121 nears the end of travel toward the first accumulator wall 113b. This progressive restriction of the opening slows the flow of hydraulic fluid and creates a cushioning effect by providing a greater resistance to movement of the accumulator piston 121 and, thus, slowing the travel rate of the accumulator piston 121 as it nears the first accumulator end wall 113b. Such an arrangement reducing the risk of shock loading from a slamming of the accumulator piston 121 into the first accumulator end wall 113b.

Having described the illustrated embodiment, it will become apparent that various modifications can be made without departing from the scope of the invention as defined in the accompanying claims.

The invention claimed is:

1. A hydraulic cylinder assembly, comprising:
   an accumulator;
   a floating accumulator piston disposed in the accumulator; and
   a hydraulic cylinder having a first piston surface for extending the hydraulic cylinder, a second piston surface for retracting the hydraulic cylinder and a third piston surface in dedicated communication with the accumulator, the accumulator being integral to the hydraulic cylinder, the accumulator being concentric with the hydraulic cylinder.

2. A hydraulic cylinder assembly, comprising:
   an accumulator having a piston, a first accumulator port, and a second accumulator port; and
   a hydraulic cylinder having a first cylinder port, a second cylinder port, and a third cylinder port, the hydraulic cylinder including a first piston surface having a first effective area, a second piston surface having a second effective area and a third piston surface having a third effective area, the first piston surface in communication with the first cylinder port, the second piston surface in communication with the second cylinder port, the third piston surface in communication with the third cylinder port, the third piston surface also in communication with the second accumulator port, the accumulator being integral to the hydraulic cylinder, the accumulator being concentric with the hydraulic cylinder.

3. The hydraulic cylinder assembly of claim 2, wherein the first effective area is about equal to the second effective area.

4. The hydraulic cylinder assembly of claim 2, wherein a pressure on the first piston surface acts to extend the hydraulic cylinder.

5. The hydraulic cylinder assembly of claim 2, wherein a pressure on the second piston surface acts to retract the hydraulic cylinder.

6. The hydraulic cylinder assembly of claim 2, wherein a retraction of the hydraulic cylinder increases a pressure in the accumulator.

7. The hydraulic cylinder assembly of claim 2, wherein an extension of the hydraulic cylinder automatically lowers a pressure in the accumulator.

8. The hydraulic cylinder assembly of claim 2, further comprising a fourth port for charging the accumulator with a gas.

9. The hydraulic cylinder assembly of claim 2, wherein the first accumulator port comprises a gas charge port.

10. The hydraulic cylinder assembly of claim 9, wherein the piston progressively blocks the second accumulator port as it nears an end of travel during an extension of the hydraulic cylinder assembly.

11. The hydraulic cylinder assembly of claim 9, wherein the third cylinder port comprises a drain for hydraulic fluid.

* * * * *